US012659264B2

(12) United States Patent
Cherrington

(10) Patent No.: US 12,659,264 B2
(45) Date of Patent: Jun. 16, 2026

(54) APPARATUSES AND METHODS FOR FACILITATING AN ACTIVE PATH INVENTORY BASED ON PATH CACHING AND DISTRIBUTION TECHNIQUES

(71) Applicant: CIENA CORPORATION, Hanover, MD (US)

(72) Inventor: John Wade Cherrington, Salt Spring Island (CA)

(73) Assignee: CIENA CORPORATION, Hanover, MD (US)

( * ) Notice: Subject to any disclaimer, the term of this patent is extended or adjusted under 35 U.S.C. 154(b) by 83 days.

(21) Appl. No.: 18/414,513

(22) Filed: Jan. 17, 2024

(65) Prior Publication Data

US 2025/0233823 A1　Jul. 17, 2025

(51) Int. Cl.
H04L 45/24 (2022.01)
H04L 45/645 (2022.01)

(52) U.S. Cl.
CPC ............ H04L 45/24 (2013.01); H04L 45/645 (2022.05)

(58) Field of Classification Search
CPC .............................. H04L 45/24; H04L 45/645
See application file for complete search history.

(56) References Cited

U.S. PATENT DOCUMENTS

| | | | | | |
|---|---|---|---|---|---|
| 6,122,283 | A | * | 9/2000 | Lee | H04L 45/02 |
| | | | | | 370/238.1 |
| 2011/0149973 | A1 | * | 6/2011 | Esteve Rothenberg | H04L 45/7452 |
| | | | | | 370/392 |
| 2013/0212285 | A1 | * | 8/2013 | Hoffmann | H04L 41/122 |
| | | | | | 709/226 |
| 2015/0062743 | A1 | * | 3/2015 | Horn | G06F 3/068 |
| | | | | | 360/55 |
| 2016/0191194 | A1 | * | 6/2016 | Wood | H04L 41/0896 |
| | | | | | 398/58 |
| 2016/0254860 | A1 | * | 9/2016 | Magri | H04Q 11/0062 |
| | | | | | 398/20 |
| 2018/0375730 | A1 | * | 12/2018 | Anand | G06F 8/65 |
| 2020/0028900 | A1 | * | 1/2020 | Rice | H04W 4/02 |
| 2025/0055786 | A1 | * | 2/2025 | Xu | H04L 45/18 |

OTHER PUBLICATIONS

"U.S. Appl. No. 18/482,980 as filed", Oct. 2023, 26 pgs.
"What are advanced analytics in optical networking?", https://www.ciena.com/insights/what-is/what-are-advanced-analytics-in-optical-networking, 2023, 9 pp.
"What is Path Computation Element (PCE)?", metaswitch, https://www.metaswitch.com/knowledge-center/reference/what-is-path-computation-element-pce, 2023.

* cited by examiner

*Primary Examiner* — Joshua D Taylor
(74) *Attorney, Agent, or Firm* — Guntin & Gust, PLC; Mark Wilinski

(57) ABSTRACT

Embodiments of the subject disclosure may include, for example, obtaining a first plurality of paths between a source and a destination included as part of a communication network or system, and providing at least a subset of the first plurality of paths to a plurality of worker nodes such that the plurality of worker nodes processes the subset of the first plurality of paths based on an optimization algorithm to generate first outputs. Other embodiments are disclosed.

20 Claims, 6 Drawing Sheets

100

200

300a

300b

OBTAIN SET OF BASELINE PATHS;
STORE SET OF BASELINE PATHS — 302c

SHARE/DISTRIBUTE SUBSET OF
BASELINE PATHS;
WORKERS PROCESS SUBSET
(POTENTIALLY SUBJECT TO
AUGMENTATION OR FILTRATION);
WORKERS SHARE/OUTPUT RESULTS — 306c

PERFORM MONITORING;
PROPAGATE NETWORK/SYSTEM CHANGES — 310c

300c

APPARATUSES AND METHODS FOR FACILITATING AN ACTIVE PATH INVENTORY BASED ON PATH CACHING AND DISTRIBUTION TECHNIQUES

FIELD OF THE DISCLOSURE

The subject disclosure relates to apparatuses and methods for facilitating an active path inventory based on path caching and distribution techniques.

BACKGROUND

As the world increasingly becomes connected via vast communication networks and systems and via various types of communication devices, additional opportunities are generated to provision communication services. The provisioning of communication services is accompanied by a host of challenges, particularly in view of the increasing demands of data-intensive applications and a scarcity of resources that are available. In this respect, network operators and service providers seek out ways to ensure that networks and systems are reliable and resilient in the face of dynamic circumstances, conditions, and events (in order to ensure high levels of quality of service (Qos) or quality of experience (QoE)), while at the same time attempting to keep resource counts low (thereby enhancing efficiency of network/system operations).

Modern networks and software frameworks rely on planning and management in respect of a use of graph databases or other representations of network/system topology. While such representations can serve various computational purposes, a significant and critical subset of the representations will involve finding and working with potential paths across the network/system. Following a change in topology or data, there is often a task of finding an inventory of potentially constrained, multiple shortest paths across the network/system at various layers/tiers so that optimization/analysis sub-systems can offer suitable optimizations, improvements, or resolutions to problems or issues. Given the sophistication of many modern communication networks and systems, the task is significant and non-trivial.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for facilitating an active path inventory in respect of a communication network, system, and/or service based on caching and distribution techniques. Other embodiments are described in the subject disclosure.

One or more aspects of this disclosure include, in whole or in part, obtaining a first plurality of paths between a source and a destination included as part of a communication network or system, and providing at least a subset of the first plurality of paths to a plurality of worker nodes such that the plurality of worker nodes processes the subset of the first plurality of paths based on an optimization algorithm to generate first outputs.

By way of introduction, aspects of this disclosure may be applied in respect of practical applications involving communication networks or systems. In particular, aspects of this disclosure may facilitate an active path inventory (ACTPI), and accompanying techniques and/or algorithms, to provide or obtain continuous, streaming path inventories based on efficient computations.

Figure 1:
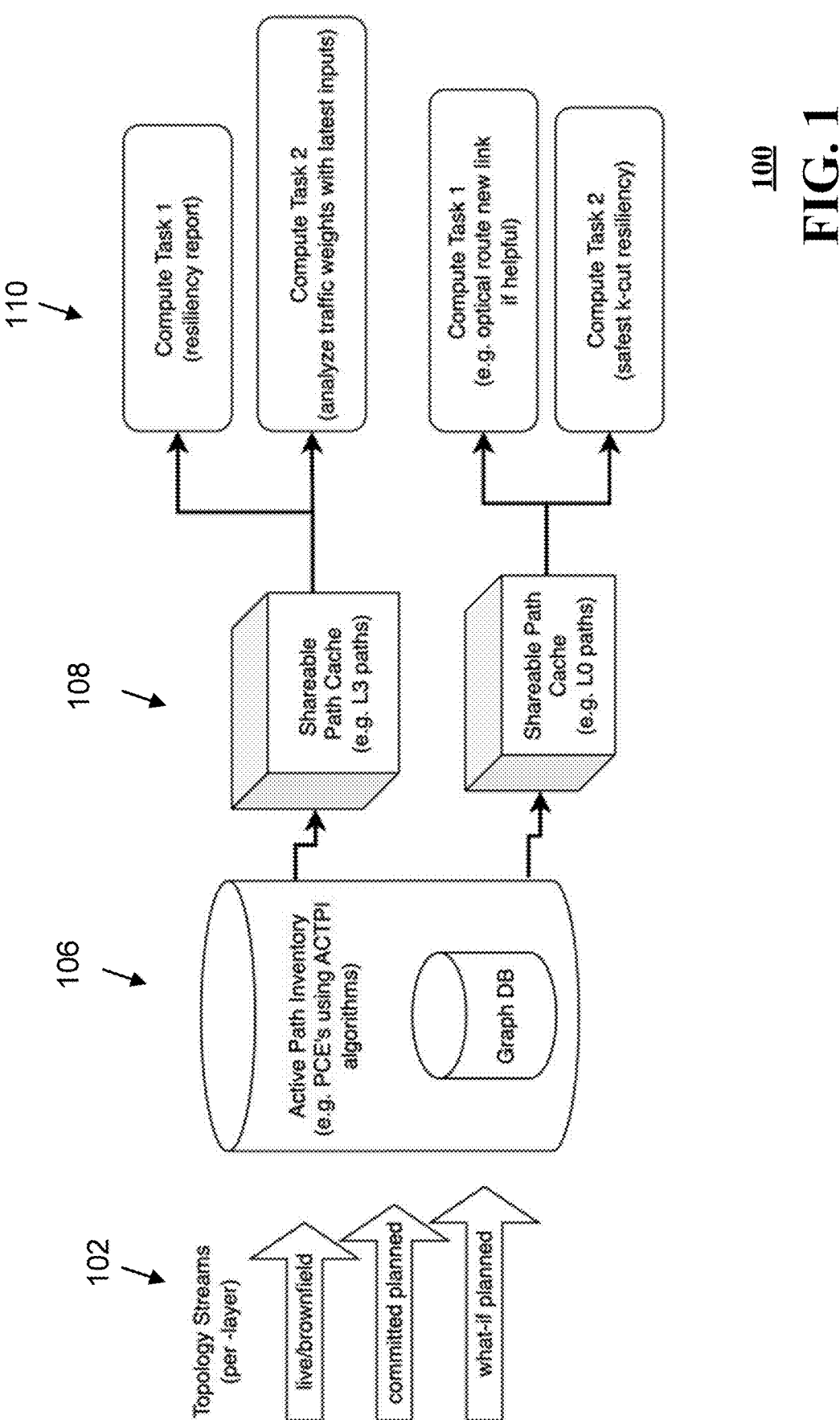
FIG. 1 is a block diagram illustrating an exemplary, non-limiting embodiment of a system for providing shareable path caches in respect of computational tasks in accordance with various aspects described herein.

With the foregoing in mind, reference may now be made to FIG. 1, which depicts a system 100. The system 100 may be used to update pairs of k-shortest constrained paths at layers/tiers of interest, potentially doing so while enhancing (e.g., maximizing) resource efficiency and reducing (e.g., minimizing) response times.

As shown in FIG. 1, a set of topology streams 102 may be provided or obtained. The topology streams 102 may be organized on a per layer or per tier basis. The streams 102 may illustratively include a first stream (denoted as live/brownfield), a second stream (denoted as committed planned), and a third stream (denoted as what-if planned). The streams 102 may be provided to an ACTPI 106, which may incorporate one or more algorithms, graphs, graph databases (DBs), path computation elements (PCEs), etc. The ACPTI 106 may provide outputs that, in turn, may serve as inputs to shareable path caches 108, such as a first cache (denoted as L3 paths) and a second cache (denoted as L0 paths). The caches 108 may feed respective computational tasks 110. For example, the first cache may facilitate a first computational task (e.g., a resiliency report) and a second computational task (e.g., an analysis of traffic weights with latest inputs); the second cache may facilitate a first computational task (e.g., a generation and/or utilization of an optical route, potentially with a new link) and a second computational task (e.g., a reduction or cut of a path or link while still maintaining resiliency).

The element or construct (of the ACTPI 106) that obtains continuously updated PCE outputs and enables filtration/querying may be referred to herein as a path cache or path DB. Due to the position of the path cache in the system 100 (e.g., due to the position of the path cache being between the upstream streams 102 and the downstream compute elements (as represented by the caches 108 and the computational tasks 110)), the path cache may be conceptualized or treated as serving as a foundation for a path DB, and may play a role in a real-time focused network/system application architecture/platform that is comparable to, but different from, more traditional graph DBs in a conventional network/system application architecture.

The path cache may provide a number of features as part of various practical applications of the system 100. For example, the path cache may: (1) be capable of memory-efficient parallelism in respect of multiple workers or computational nodes, (2) be consistent with changes or modifications that are made to a communication network or system (where such changes/modifications may be asynchronous in nature), and/or (3) be capable of delegating and/or combining paths from multiple sources to present admissible, multi-layered/multi-tiered alternative routes/paths. Aspects of each of (1)-(3) are described in further detail below.

Communication network or system optimization, potentially involving multiple routes or paths, may require an efficient evaluation of various quantities, data points/sets, or the like. Both exact/precision algorithms, as well as heuristic algorithms, may be conceptualized or treated as exploring a global fitness landscape, potentially in combination with more localized or regionalized constraints/considerations. In view of the parallelism referenced above, different types of scenarios of parallelism may be considered: (1) a fixed choice scenario, where each parallel node or worker pursues enhancements (e.g., optimizations) utilizing a same/common set of paths but explores different parts/portions of the landscape, potentially synchronizing with other nodes/workers in accordance with a schedule (e.g., periodically), (2) a multiple choice scenario, where dependencies on a same/common path inventory are considered but a variety of non-path parameter values of interest may be taken into account, and (3) alternate or cross-scenario path sharing, where each parallel node/worker pursues enhancements (e.g., optimizations) in accordance with a baseline set of paths, while potentially affording flexibility to remove one or more paths from consideration and/or add one or more paths for consideration. Various embodiments of this disclosure may blend or combine aspects of different types of scenarios to generate additional scenarios.

Figure 2:
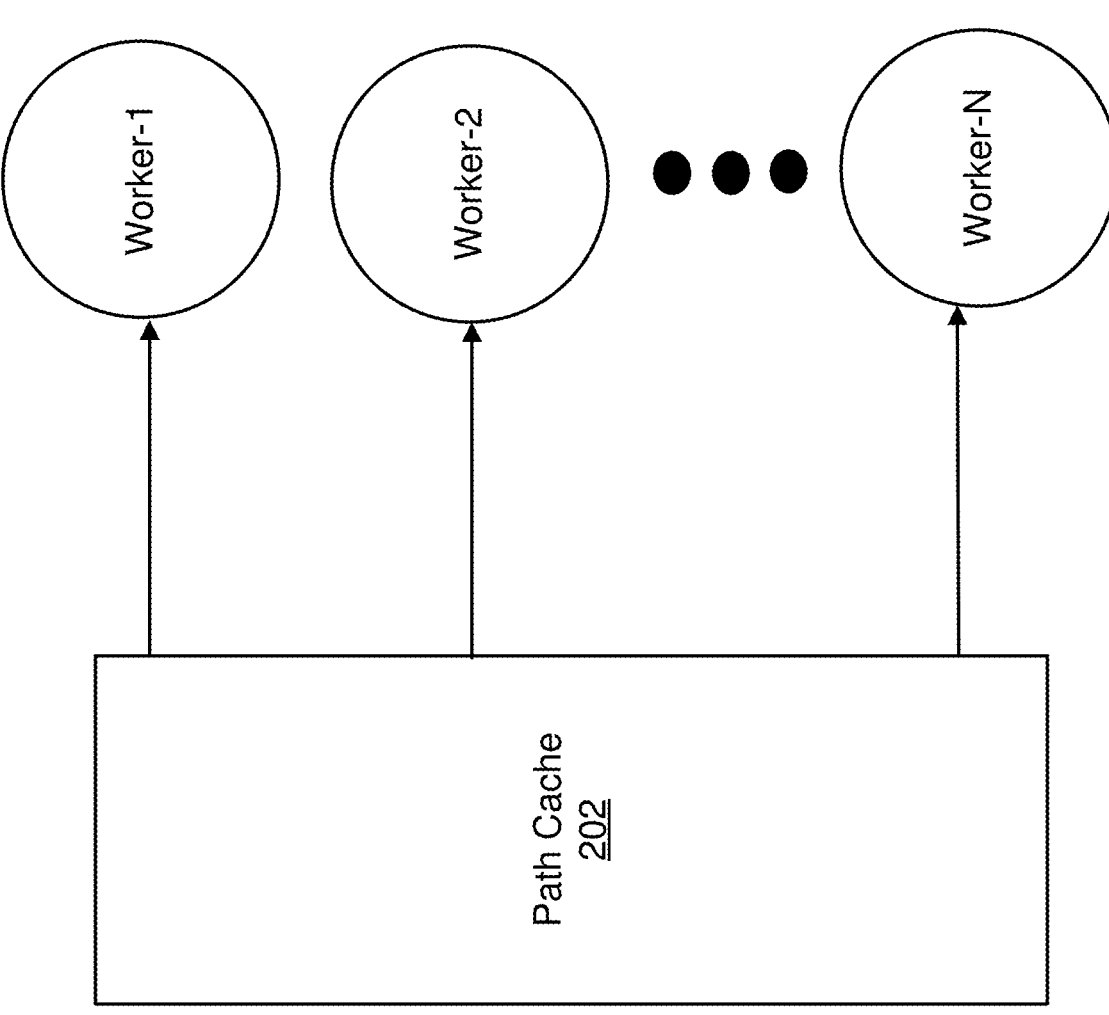
FIG. 2 is a block diagram illustrating an exemplary, non-limiting embodiment of a system for sharing or utilizing a path cache in respect of workers in accordance with aspects of this disclosure.

In respect of the (three) scenarios of parallelism described above, it may be possible, and even valuable/useful, to share a path cache instance across a pool of nodes/workers. For example, and with reference to FIG. 2, a system 200 is shown that may be used to facilitate, e.g., the first and second scenarios set forth above. The system 200 may include a path cache 202 that may be shared/accessed across a pool of nodes or workers (denoted as Worker-1, Worker-2, . . . . Worker-N in FIG. 2). The path cache 202 may be administered via a read-only memory. A use of a read-only memory may be sufficient, as the workers might not be provided with a capability to vary the paths involved. Of course, in some embodiments such flexibility in terms of an ability to vary the paths may be included/provided.

Figure 3A:
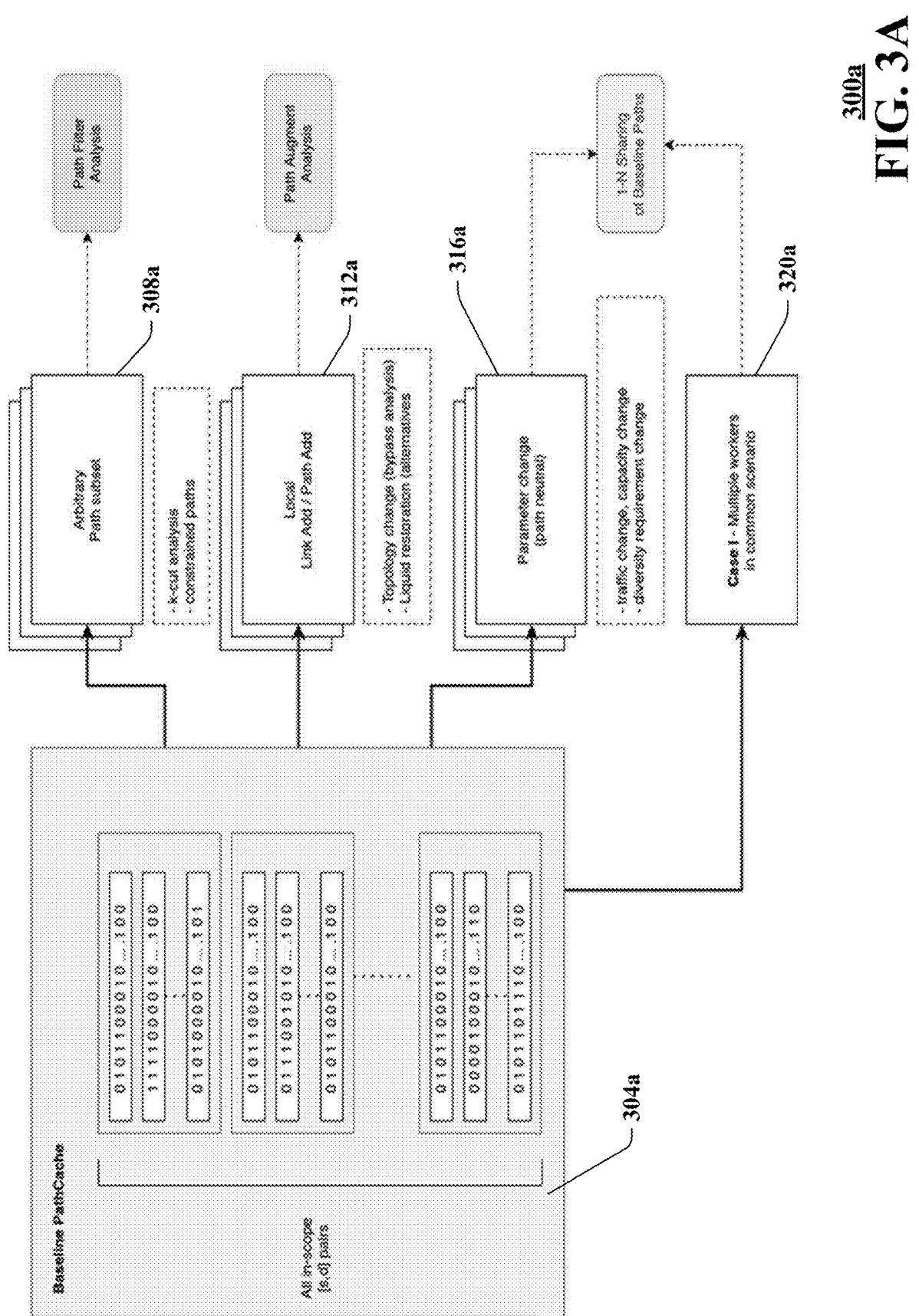
FIG. 3A is a block diagram of a system for sharing actively maintained paths in a path cache in accordance with aspects of this disclosure.

With reference to FIG. 3A, a system 300a is shown. The system 300a may provide an ability for sharing actively maintained paths in a path cache (e.g., the path cache 202 of FIG. 2). The system 300a may include baseline paths 304a, where the baseline paths 304a may be represented as a set of source-to-destination [s, d] pairs. The baseline paths 304a may be subjected to different types of arrangements or considerations, such as for example a filtration analysis on the basis of a subset of the paths (as represented by reference character 308a). For example, the filtration analysis may be based on a performance of a k-cut analysis, as potentially applied to one or more constraints (yielding constrained paths), to down-filter or down-select relative to the baseline paths 304a. The different types of arrangements or considerations may include a path augmentation based on a local link addition or path addition (as represented by reference character 312a). For example, the local link addition or path addition may be based on a topology change (e.g., a bypass analysis) and/or so-called liquid restoration alternatives as described in further detail below. The different types of arrangements or considerations may include a path neutral parameter change (as represented by reference character 316a). For example, the path neutral parameter change may be based on changes or modifications in traffic, capacity, diversity requirements, etc. The different types of arrangements or considerations may include, or be based on, multiple workers/nodes arranged in accordance with the fixed choice scenario referenced above (as represented by the reference character 320a). One or both of the parameter change (reference character 316a) and the multiple worker fixed choice scenario (reference character 320a) may result in a sharing of 1 through N baseline paths (N being a number in this context).

In terms of filtration analysis described above, a baseline array of paths (e.g., the baseline paths 304a) may be subjected to a mask (e.g., a bit mask) that may determine/identify/select active and inactive paths. Assuming that the bit mask is selected to be small (meaning that the number of zeros included in the bit mask is low-less than a threshold), the impact of the use of the bit mask may be small/negligible in terms of differences in time (for accesses by workers/nodes) and space (e.g., the bit mask may tend to exclude a small fraction of data or paths in the path cache).

In terms of the path augmentation, when a small number (e.g., on the order of ten) additional paths are considered, it may be checked to ensure that an evaluation of objective functions involved in, e.g., L3 and L0 optimization can be evaluated/analyzed primarily in terms of an original baseline (e.g., the baseline paths 304a) plus an incremental, boundedly small calculation involving an auxiliary structure or representation. In many instances, the addition of the paths does not represent an appreciable penalty, thus allowing for flexibility. To demonstrate, aspects of path augmentation may be applied in respect of practical applications involving traffic engineering or congestion management in respect of network/system resources involving multiple paths, L0 diversity optimization, incremental topology changes, and/or liquid restoration.

Aspects of the foregoing demonstrate how a sharing of an instance of a path cache across nodes/workers allow many different problems or issues with various parameters or constraints, including small differences in path content, to be addressed without incurring the cost or expense of generating multiple copies of the path cache. As set forth above, aspects of parallelism may be utilized or exploited to realize solutions for addressing such problems/issues.

A path controller (or, analogously, a path controller layer) may be used or included for generating or providing potential paths meeting goals or requirements (e.g., scope of optimization goals or requirements) to a path cache. In some embodiments, the path cache may hold or store paths (e.g., baseline paths) and/or may provide access to, or maintain, updates to the paths. In this respect, and with reference to FIG. 3B, a system 300b is shown. The system 300b may provide consistency/coherency in respect of changes or modifications (e.g., asynchronous changes or modifications) to a communication network or system.

Figure 3B:
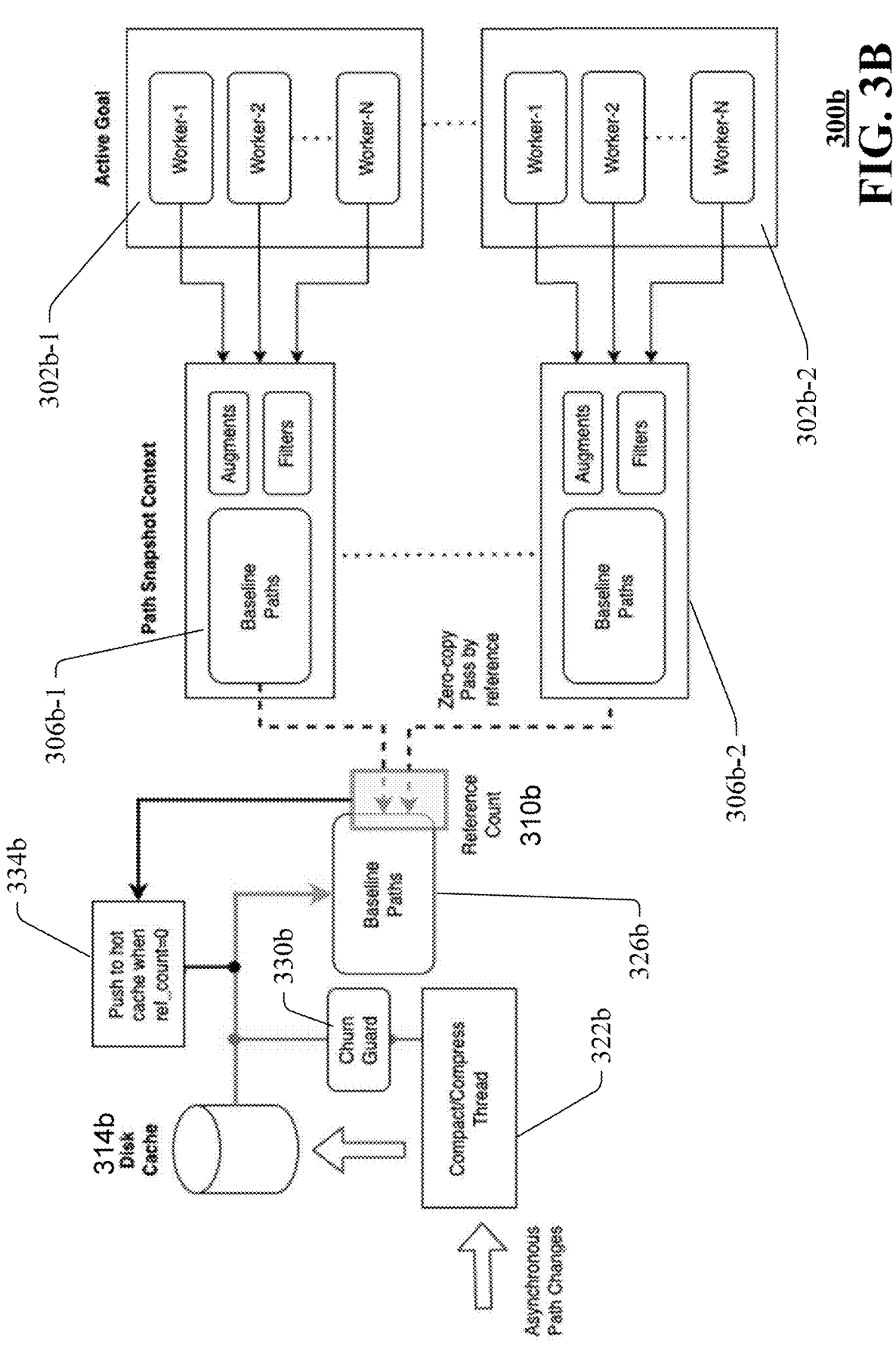
FIG. 3B is a block diagram of a system for providing consistency/coherency in respect of changes or modifications to a communication network or system in accordance with aspects of this disclosure.

As shown in FIG. 3B, the system 300b may include one or more pods or pools of workers, such as a first pod 302b-1 and a second pod 302b-2. Each of the pods 302b-1 and 302b-2 may be associated with a respective path snapshot context—e.g., a first path snapshot context 306b-1 in the case of the first pod 302b-1 and a second path snapshot context 306b-2 in the case of the second pod 302b-2. Each of the path snapshot contexts 306*b*-1 and 306*b*-2 may, at least at one point in time, include a reference to an instance/ version of a baseline path, as well as indicators of any augmentation or filtration (such as the augmentation and filtration described above). A reference count/counter 310*b* may be used to maintain a count or number of snapshot contexts keeping track of one or more of the baseline paths. Furthermore, when path references exist any incoming path changes (e.g., asynchronous path changes) may be compacted (e.g., add/remove/update events in respect of a path may be de-duplicated) and compressed, such as by way of compact/compress thread 322*b*, and then pushed to disk 314*b*.

When the reference count provided via the counter 310*b* falls to zero, this may indicate that no further optimization goals (as represented by the pods—e.g., the pods 302*b*-1/ 302*b*-2) may be using the associated snapshot. In such an instance, the representation in the disk 314*b* may be moved to the baseline paths 326*b* (as represented by reference character 334*b*), where the representation of the baseline paths 326*b* in FIG. 3B may correspond to in-memory availability/accessibility. Thereafter, any new contexts/snapshot contexts may have up-to-date access via the baseline paths 326*b*. Stated differently, and as described further below, movement of path changes from disk 314*b* to baseline paths/in-memory 326*b* may be used to ensure consistency or coherency in the face of changes.

The system 300*b* may include logic to handle so-called churn, as fairly represented by the churn guard 330*b* shown in FIG. 3B. The inclusion of the churn guard 330*b* may be based on a recognition that communication network or system changes may come in "waves"—e.g., a count or extent of changes may exceed a threshold, potentially within a threshold amount of time. During such situations where the nature or extent of the changes is high, it may be counter-productive to attempt to work with a "current snapshot context", as a snapshot context may tend to become stale, obsolete, or invalid soon thereafter. The churn guard 330*b* may be responsible for handling the emergence and fading of high-churn activities or changes, and can selectively gate or control transfer of state from the disk 314*b*.

As described above, aspects of this disclosure, inclusive of aspects of a path cache, may be capable of delegating and/or combining paths from multiple sources to present admissible, multi-layered/multi-tiered alternative routes/ paths. In some embodiments, a path cache may synthesize a bit-set or vector like representation of paths (e.g., a '0' of 'off' value may be present in the $i^{th}$ position if the $i^{th}$ edge is absent from the graph/set; otherwise, a value of '1' or 'on' may be present in the $i^{th}$ position to denote the presence of the $i^{th}$ edge). For set intersection, fast bitwise operations may be used. In the context of an edge-weighted link, a bit may be weighted (e.g., multiplied) by a weighting-factor for further/onward evaluation. As a further measure of representation, there may be different topologies per-layer, inter-layer connectivity, and in general a multiplicity of edges based on the depth of a patch cache for each [s,d] pair. What is important to note is that the entirety of the all-paths framework may be summarized by single hop edges for all pairs. This, in turn, leads to a derived "path graph" that has a minimal diameter of one (that is, all points may be reachable by any point via one hop). Due to a utilization of k-shortest techniques (as such techniques would be understood by one of skill in the art), there may be many parallel edges; this can, in turn, be moderated by an ordered cut-off depending on how deep (which, in turn, is a representation of accuracy) versus how fast algorithms using the representations need to be.

As described above, aspects of this disclosure may be applied in respect of liquid restoration. As one skilled in the art will appreciate, liquid restoration may refer to a leveraging of existing network/system margin and flexibility adjusting transport capacity of deployed resources (e.g., coherent optics in a case of optical networking) to recover or restore traffic across one or more available paths. In this regard, when a fiber is cut, the ingress optical port where optical services crossing the cut fiber are blocked can be directed to a site where a router with sufficient capacity can absorb the stranded traffic. From this router, traffic may follow existing L3 routes to the original destination. With all-pairs potential L0 paths already cached, and an established L3 link with capacity properties also known to the traversal component of a path cache, a lowest-cost/best-performance hybrid path can be identified. An extended version of this principle may cause a L3 traffic component to use weighted multi-paths if, for example, a single L3 path is insufficient.

It may be assumed in at least some of the foregoing examples that the L0 layer has been filled with all [s,d] pairs, not just current links. As a space-time trade off, if it is not desirable to populate all pairs, a reversion may be made to a delegated PCE. However, in an environment or setting where a L3 link topology may be incrementally or more globally optimized, a standing cache of all pairs L0 paths may be utilized to support all potential topologies. More generally, and based on declared or established optimization goals, an appropriate caching policy can be established and enforced.

In accordance with aspects set forth above, the potential "heavy-weightedness" of caching many all-pairs paths may be compensated for by the ability to share the context with multiple parallel processes, workers, nodes, and the like. The potential consistency aspects of having ongoing path updates may be addressed by a suitable snapshot and buffering-to-disk, followed by a transfer to in-memory, as described above. A tunable churn guard may be included/ provided as needed/appropriate under the circumstances. Having cached several network layers and absorbed suitable inter-layer relationships, a path cache of this disclosure may rapidly traverse a low-diameter, graph-compressed presentation of full connectivity to evaluate uniquely single and/or multi-layer solutions such as those that arise in liquid restoration and other practical applications.

When examining length-ordered paths for a particular source-destination pair or across multiple (e.g., all) source-destination pairs, such pairs may be conceptualized or treated as strings of characters, where a character is a unique edge. As such, a vast variety of (lossless) compression algorithms may be available to choose from. In general, these algorithms may be used to replace substring "tokens"; these are in turn interpretable as sub-paths, which may be referred to as "pathlets". In a memory constrained setting, the decoding of pathlets into individual edges can be done at the point of compute while the shareable path cache is in a lighter-weight encoded form. Uniquely, since a path cache may hold/store the all-pairs k-shortest (and not just the k-shortest from single source and destination), the potential for compression is particularly high/applicable. Stated differently, a use of sub-paths or pathlets may enable an efficient use of memory resources, particularly in settings or environments where the path-sets are large or complex (e.g., where the path-sets exceed a threshold in terms of count, length, or complexity).

In a deep optimization scenario where, for example, a diversity constraint is being imposed, the mutual satisfaction of that constraint by all (optical) paths may lead to longer paths. Thus, there may be situations where a solution exists but is beyond a default path cut-off. Assuming no intervening network/system topology or relevant properties have occurred, the upstream path generation can be viewed as ongoing, pausing (but not releasing) memory upon reaching the default target. From this default position, these path generation/identification techniques can be continued towards finding longer paths, as potentially signaled or requested by a downstream application.

Figure 3C:
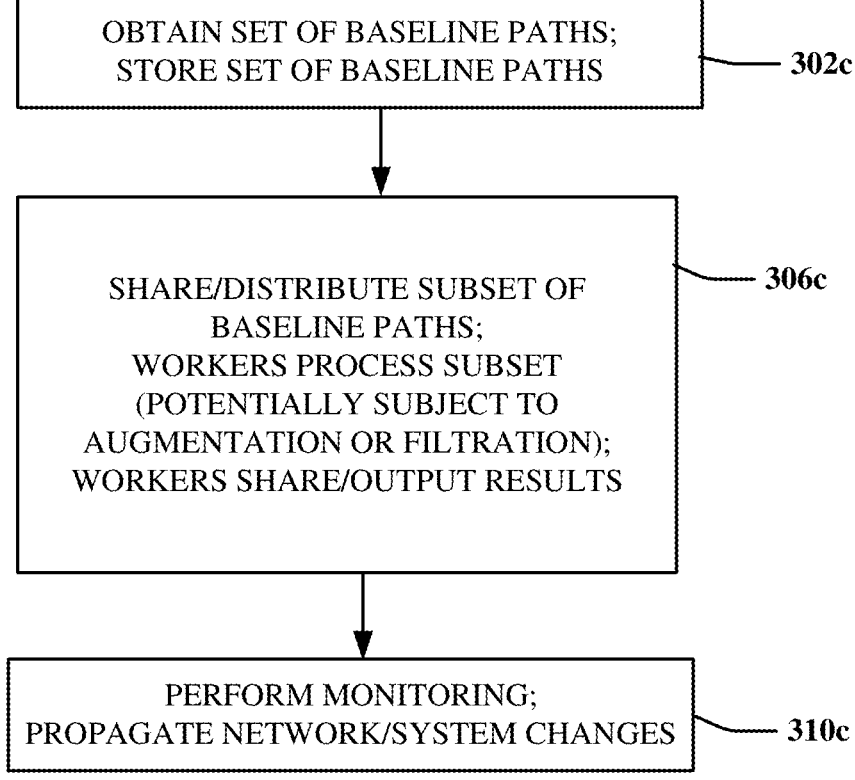
FIG. 3C depicts a flowchart of an illustrative embodiment of a method in accordance with various aspects described herein.

Referring now to FIG. 3C, a flowchart of an exemplary method 300c in accordance with various aspects of this disclosure is shown. The method 300c may be implemented (e.g., executed), in whole or in part, in conjunction with one or more systems, devices, and/or components, such as for example the systems, devices, and components set forth herein. The method 300c may be used as part of communication network and system planning and maintenance operations in respect of one or more communication services and/or applications. Aspects of the method 300c may be represented as blocks as shown in FIG. 3C. The blocks may correspond to operations that may be facilitated via a use of a processing system that may include one or more processors. The operations may be embodied as instructions (where the instructions may be stored as part of a memory, a computer-readable medium [e.g., a non-transitory computer-readable medium], or the like) that may be executed by the processing system to realize some or all of the functionality/features of the method 300c.

In block 302c, a set of baseline paths may be obtained. The set of baseline paths (which may include one or more baseline paths) may be generated or derived via one or more techniques, such as for example via the techniques of U.S. patent application Ser. No. 18/482,980, filed on Oct. 9, 2023 and entitled "Apparatuses And Methods For Facilitating An Active Path Inventory Via Path Sourcing Algorithms", the contents of which are incorporated herein by way of reference. As part of block 302c, the baseline paths may be stored in a storage device or element (such as a path cache as described above).

In block 306c, the set of baseline paths (or a subset thereof) may be provided, shared, or distributed amongst workers (or, analogously, amongst pods/pools/groups of workers or nodes). The sharing/distribution in this context may enable the workers to utilize/process the (subset of the) baseline paths in conjunction with optimization algorithms/computations/determinations, potentially with reference to one or more requirements, specifications, or goals. In some embodiments, flexibility may be provided to such computations/determinations in accordance with principles of, e.g., filtration and augmentation as described above. Any computations/determinations/outputs that may be generated as part of block 306c may potentially be shared with, or output to, e.g., a central node, other workers/nodes, etc. The outputs may include a ranking or identification/selection/determination of one or more paths, potentially in accordance with the requirements, specifications, or goals.

In some instances, one or more of the baseline paths of blocks 302c and 306c may be specified at multiple layers (e.g., layers L3 and L0 in a given embodiment). To demonstrate, a fiber cut at layer L0 may result in a computation/analysis to be performed as part of block 306c in respect of packetized traffic/congestion as applied to layer L3. In this regard, it is understood that there may be provided an ability to combine outputs or conditions at different layers within an interlayer structure to form paths or graphs for identifying multi-layer solutions to issues/problems that may arise (either in actuality, or hypothetically in respect of planning operations to determine/identify, e.g., network/system resiliency).

In block 310c, monitoring may be performed in respect of communication network or system changes. To the extent that any changes are identified based on the monitoring, the changes may be buffered until such a point in time that the changes can be propagated, or made available, to workers/nodes for analysis/computation (potentially by way of a transfer from disk to memory). For example, the buffering may occur/take place until a prior instance or version of a network/system topology has been processed by workers/nodes. In this manner, an intelligent staging or presentation of the changes/updates/modifications to paths may be provided, while ensuring consistency/coherency in respect of worker/node computations/calculations regarding paths/path optimization.

It is understood and appreciated that aspects of some of the operations/blocks shown and described above in relation to FIG. 3C may be optional in some embodiments. Further, in some embodiments additional operations/blocks not shown may be included. Still further, the order or sequence of the operations/blocks may be different from what is explicitly shown in FIG. 3C.

The various aspects of this disclosure may be used to facilitate a cache path that may be used as part of numerous practical applications associated with communication networks and systems. For example, a path cache (or other storage device or entity) of this disclosure may provide for a sharing of baseline paths to reduce (e.g., avoid) memory duplication and in respect of worker/node optimization goals. One aspect is an ability to parallelize across scenarios with precisely the same path content; another aspect is the realization/attainment of suitable filter and augment concepts, applicable to bit-vector/bit-set path representations that may arise in network/system optimizations. In some embodiments, a buffering of incoming changes using input/output (I/O) efficient interchanges between a bounded number of in-memory working buffers and an assumed larger amount of disk storage may be provided/realized. Aspects of this disclosure may provide an ability to combine path outputs from different layers within an interlayer structure/platform/framework to form a low-diameter effective graph (which may be referred to herein as a "traversal representation", to coexist with path edge-set representations) for prospecting uniquely multi-layer resolutions/improvements. In brief, and as demonstrated herein, the various aspects of this disclosure are integrated as part of numerous practical applications, where such aspects represent improvements to technology. In this respect, and as one of skill in the art will appreciate based on a review of this disclosure, the various aspects of this disclosure are not directed to abstract ideas. To the contrary, the various aspects of this disclosure are directed to, and encompass, significantly more than any abstract idea standing alone.

Figure 4:
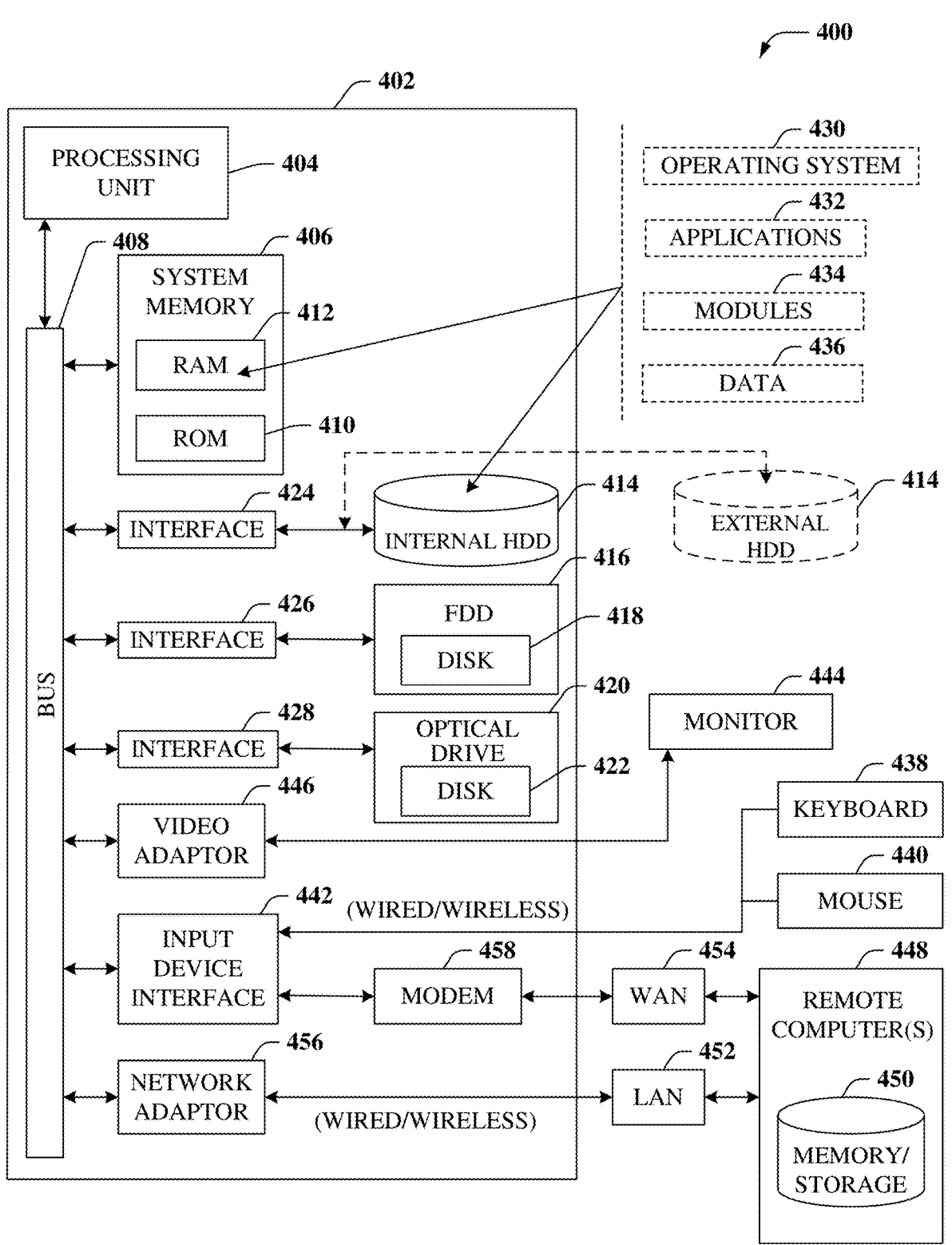
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. For example, the computing environment 400 can facilitate, in whole or in part, obtaining a first plurality of paths between a source and a destination included as part of a communication network or system, and providing at least a subset of the first plurality of paths to a plurality of worker nodes such that the plurality of worker nodes processes the subset of the first plurality of paths based on an optimization algorithm to generate first outputs.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized. Instances of elements or functions may be distinguished or differentiated from one another via a use of the terms "first", "second", "third", and the like. The instances may correspond to a same or similar type, or may correspond to different types.

What is claimed is:

1. A non-transitory machine-readable medium, comprising executable instructions that, when executed by a processing system including a processor, facilitate performance of operations, the operations comprising:

obtaining a first plurality of paths between a source and a destination, wherein the first plurality of paths is included as part of a communication network or system; and providing at least a subset of the first plurality of paths to a plurality of worker nodes such that the plurality of worker nodes processes the subset of the first plurality of paths in parallel based on an optimization algorithm to generate first outputs, wherein the first outputs include an output that traverses a plurality of layers of the communication network or system, wherein the plurality of layers includes a L0 layer and a L3 layer, and wherein the output traverses the plurality of layers based on a fiber cut at the L0 layer and packetized traffic congestion applied at the L3 layer.

2. The non-transitory machine-readable medium of claim 1, wherein the operations further comprise:

monitoring for changes in respect of the communication network or system;

identifying, based on the monitoring, a change in the communication network or system; and modifying, based on the identifying, the first plurality of paths to generate a second plurality of paths that is at least partially different from the first plurality of paths.

3. The non-transitory machine-readable medium of claim 2, wherein the operations further comprise:

providing access to at least a subset of the second plurality of paths to the plurality of worker nodes.

4. The non-transitory machine-readable medium of claim 3, wherein the providing of the access is such that the plurality of worker nodes processes the subset of the second plurality of paths to generate second outputs, the second outputs being based on the optimization algorithm, and the second outputs being at least partially different from the first outputs.

5. The non-transitory machine-readable medium of claim 3, wherein the providing of the access comprises transferring the at least a subset of the second plurality of paths from a disk to a memory.

6. The non-transitory machine-readable medium of claim 3, wherein the operations further comprise:

determining that the plurality of worker nodes has finished processing the subset of the first plurality of paths, resulting in a determination, wherein the providing of the access is based on the determination.

7. The non-transitory machine-readable medium of claim 1, wherein the providing of the at least a subset of the first plurality of paths to the plurality of worker nodes such that the plurality of worker nodes processes the subset of the first plurality of paths based on the optimization algorithm to generate the first outputs comprises providing the at least a subset of the first plurality of paths to the plurality of worker nodes such that the plurality of worker nodes filters the subset of the first plurality of paths.

8. The non-transitory machine-readable medium of claim 1, wherein the providing of the at least a subset of the first plurality of paths to the plurality of worker nodes such that the plurality of worker nodes processes the subset of the first plurality of paths based on the optimization algorithm to generate the first outputs comprises providing the at least a subset of the first plurality of paths to the plurality of worker nodes such that the plurality of worker nodes augment the subset of the first plurality of paths with an additional path.

9. The non-transitory machine-readable medium of claim 8, wherein the additional path is excluded from the first plurality of paths.

10. The non-transitory machine-readable medium of claim 1, wherein the communication network or system comprises a fiber communication network or system.

11. The non-transitory machine-readable medium of claim 1, wherein the operations further comprise:

subsequent to the providing of the at least a subset of the first plurality of paths to the plurality of worker nodes, obtaining a request from a worker node included in the plurality of worker nodes for an additional path that is excluded from the at least a subset of the first plurality of paths, wherein the request is based on a diversity requirement associated with an execution of an application, the application providing a communication service as part of the communication network or system; and providing, based on the obtaining of the request, the additional path to the worker node.

12. The non-transitory machine-readable medium of claim 1, wherein the providing the at least a subset of the first plurality of paths to the plurality of worker nodes supports multiple parallelism scenarios including: shared-path evaluation under distinct constraints, distinct-path evaluation, and dynamic path sharing among worker nodes.

13. The non-transitory machine-readable medium of claim 1, wherein the operations further comprise:

examining length-ordered path sets for a plurality of source-destination pairs, the path sets corresponding to respective strings of characters;

determining, based on the examining, that the path sets exceed a threshold in terms of count, length, or complexity;

applying, based on the determining, a compression algorithm to replace substring tokens of the respective strings of characters, the applying resulting in pathlets; and storing the pathlets in a storage device.

14. The non-transitory machine-readable medium of claim 1, wherein the fiber cut and the packetized traffic congestion are applied in respect of planning operations to identify a resiliency of the communication network or system.

15. A method, comprising:

obtaining, by a processing system including a processor, a first plurality of paths between a source and a destination, wherein the first plurality of paths is included as part of a communication network or system; and providing, by the processing system, at least a subset of the first plurality of paths to a plurality of worker nodes such that the plurality of worker nodes processes the subset of the first plurality of paths in parallel based on an optimization algorithm to generate first outputs, wherein the first outputs include an output that traverses a plurality of layers of the communication network or system, wherein the plurality of layers includes a L0 layer and a L3 layer, and wherein the output traverses the plurality of layers based on a fiber cut at the L0 layer and packetized traffic congestion applied at the L3 layer.

16. The method of claim 15, wherein the subset of the first plurality of paths comprises a path that traverses a plurality of layers of the communication network or system.

17. The method of claim 15, wherein the obtaining of the first plurality of paths comprises obtaining the first plurality of paths from a disk in accordance with monitoring for changes to the communication network or system.

18. A device, comprising:

a processing system including a processor; and a memory that stores executable instructions that, when executed by the processing system, facilitate performance of operations, the operations comprising:

obtaining a first plurality of paths between a source and a destination, wherein the first plurality of paths is included as part of a communication network or system; and providing at least a subset of the first plurality of paths to a plurality of worker nodes such that the plurality of worker nodes processes the subset of the first plurality of paths in parallel based on an optimization algorithm to generate first outputs, wherein the first outputs include an output that traverses a plurality of layers of the communication network or system, wherein the plurality of layers includes a L0 layer and a L3 layer, and wherein the output traverses the plurality of layers based on a fiber cut at the L0 layer and packetized traffic congestion applied at the L3 layer.

19. The device of claim 18, wherein the subset of the first plurality of paths comprises a path that traverses a plurality of layers of the communication network or system, wherein the obtaining of the first plurality of paths comprises obtaining the first plurality of paths in accordance with monitoring for changes to the communication network or system.

20. The device of claim 18, wherein the plurality of worker nodes processes the subset of the first plurality of paths further based on at least one parameter change, wherein the at least one parameter change is based on a change in traffic, capacity, diversity requirements, or any combination thereof, in the communication network or system, wherein the subset of the first plurality of paths is less than an entirety of the first plurality of paths, and wherein the operations further comprise:

selecting the subset of the first plurality of paths in accordance with a bit mask; and selecting a size of the bit mask in accordance with a difference in time and space for the plurality of worker nodes to process the subset of the first plurality of paths relative to the time and space for the plurality of worker nodes to process the entirety of the first plurality of paths.

\* \* \* \* \*